(12) United States Patent
Beutter et al.

(10) Patent No.: US 7,374,175 B2
(45) Date of Patent: May 20, 2008

(54) SHIELDING COMPONENT, IN PARTICULAR A HEAT SHIELD

(75) Inventors: Ulrich Beutter, Reutlingen-Reicheneck (DE); Harald Stauber, Zirndorf (DE)

(73) Assignee: ElringKlinger AG, Dettingen/Erms (DE)

( * ) Notice: Subject to any disclaimer, the term of this patent is extended or adjusted under 35 U.S.C. 154(b) by 0 days.

(21) Appl. No.: 11/133,451

(22) Filed: May 20, 2005

(65) Prior Publication Data

US 2006/0219433 A1 Oct. 5, 2006

(30) Foreign Application Priority Data

Apr. 2, 2005 (DE) .................. 10 2005 015 244

(51) Int. Cl.
*F02F 11/00* (2006.01)
*F16L 21/02* (2006.01)

(52) U.S. Cl. ...................... 277/591; 277/602

(58) Field of Classification Search .......... 174/35 GC, 174/35 MS, 35 R, 52.1, 52.4, 2; 361/704, 361/719; 277/598, 630, 602, 591; 237/79
See application file for complete search history.

(56) References Cited

U.S. PATENT DOCUMENTS 3,904,379 A 9/1975 Oser

| 5,011,743 | A | * | 4/1991 | Sheridan et al. | 428/600 |
| 5,132,875 | A | * | 7/1992 | Plesinger | 361/704 |
| 5,463,529 | A | * | 10/1995 | Chia et al. | 361/704 |
| 5,566,052 | A | * | 10/1996 | Hughes | 361/704 |
| 5,791,660 | A | * | 8/1998 | Belter | 277/598 |
| 7,048,201 | B2 | * | 5/2006 | Kerchner et al. | 237/79 |

FOREIGN PATENT DOCUMENTS

| DE | 43 00 817 A1 | 7/1993 |
| DE | 195 08 872 A1 | 9/1996 |
| DE | 693 04 642 T2 | 3/1997 |
| DE | 197 00 628 C2 | 7/1998 |

\* cited by examiner

*Primary Examiner*—Hung V Ngo
(74) *Attorney, Agent, or Firm*—Roylance, Abrams, Berdo & Goodman, L.L.P.

(57) ABSTRACT

A shielding component, in particular a heat shield, has shield components (10, 12, 14) which are made flat, which lie at least partially on top of one another, and which are connected to one another at least partially along at least one common connecting line (16). Along the common connecting line (16), at least one shield component (14) encompassing another shield component (10, 12) in an overlap (18). Within the overlap (18), the shield components (10, 12, 14) are held at least partially by frictional engagement so as to be displaceable against one another relative to a compensation distance. A rigid connection of the shield components with their individual layers is avoided. Rather, depending on the thermal situation, they can mutually slide off one another.

22 Claims, 2 Drawing Sheets

SHIELDING COMPONENT, IN PARTICULAR A HEAT SHIELD

REFERENCE TO RELATED APPLICATION

This application is related to U.S. patent application Ser. No. 11/133,453, entitled "Shielding Component, in Particular a Heat Shield" filed on May 20, 2006 in the names of Ulrich Beutter and Harald Stauber.

FIELD OF THE INVENTION

The present invention relates to a shielding component, in particular a heat shield, formed of shield components. The shield components are made flat, lie at least partially on top of one another, and are connected to one another at least partially along at least one common connecting line. Along the common connecting line, at least one shield component encompasses another shield component in an overlap.

BACKGROUND OF THE INVENTION

While heat development, for example of a high-economy, performance-optimized diesel engine, can be very low on the cylinder crankshaft housing, this low heat development in no way applies to "hot zones" such as manifolds, turbochargers, catalytic converters, etc. Due to the more and more compact construction of engines, components which are not thermally "compatible" are increasingly being placed in close proximity to one another. Accordingly, heat-sensitive assemblies, such as sensors, fuel lines, pressure cells, body parts, etc., must be protected against adjacent thermal engine components. The situation is exacerbated by the compact structure in that the high packing density of the assemblies constricts the cooling air flow in the engine compartment. Noise abatement measures can also contribute to this high packing density. Thus, for example, plastic bottom plates, designed to reduce the emission of noise from the engine compartment to the roadway, under certain circumstances can produce effective insulation with which heat is enclosed in the engine compartment. Catalytic converters, due to their phased high surface temperature, are considered to be among the heat sources which certainly may necessitate the use of protective shield barriers. One typical example of this need is design measures such as positioning the catalytic converter close by the manifold. This design principle, which performs the function of rapid heat-up of the catalytic converter reducing emissions in the cold start phase, shifts a major source of heat into the engine compartment where numerous assemblies are crowded in a tight space. One reason for the growing importance of shielding components, such as heat shields, is the trend toward use of thermoplastics. The light and economical materials with their exceptional moldability are rapidly becoming common in the engine compartment, but require special attention with respect to ambient temperatures at the application site relative to other thermal engine parts ("New materials and development tools for heat protection", in MTZ 12/2001, Vol. 72, pp. 1044 ff).

DE 102 47 641 B3 discloses a structural component in the form of a noise-damping shielding component, as a component of a motor vehicle. To improve acoustic insulation, this shielding component has shield components which are made flat, which lie at least partially on top of one another, which accommodate an insulating intermediate layer between themselves, and which are joined to one another on the outer circumferential side along a common connecting line for secure connection to one another. The joining is by one shielding component with overlap of the insulating intermediate layer encompassing the other shielding component in the same overlap in the manner of flanging. This known positive-locking connection fixes the individual layers or shield components immovably relative to one another. As a result, the produced connection is rigid. In this way, especially in thermal expansion processes for the shielding component, problems arise in fixing it, especially when, as in the indicated known solution, the shielding component is fixed within the engine compartment on its stationary parts by angular bracket legs which act on the edge side. Possible warping of the multilayer shielding component with potential bulging and tearing of the heat shield material can occur, which can lead to failure of the shielding component. The angular bracket legs as fixing means can become detached from the engine components by the provided screw connection. In this way, the shielding component can be released requiring the corresponding repair and maintenance. The known solution is also expensive to implement, since angular bracket legs must be provided in addition for fixing. This fixing also increases the installation cost in production lines of motor vehicles.

SUMMARY OF THE INVENTION

An object of the present invention is to provide an improved heat shield having very good acoustic and heat insulation, such that even under strong thermal stress reliable operation is ensured.

Another object is to provide a heat shield where less installation space is required with simultaneously increased stiffness and strength.

These objects are achieved by a shielding component where the shield components are held by frictional engagement so as to be displaceable against one another relative to a compensation distance. A rigid connection of the shield components with their individual layers is avoided. Depending on the thermal situation, they can mutually "slide" off one another, without the connection being adversely affected along the common connecting line. Based on the allowed displacement motion of the shield components relative to one another, bulging effects on the shield components are avoided. Also, they do not tear, not even in the area of their attachment to other machine or vehicle parts. Since in any thermal situation and in any fixing state the frictional connection of the shield components with the displacement possibility is maintained, the shielding component of the present invention can also be used in such thermally stressed zones, for example directly in the gasket area of the cylinder head gasket, where previous use of these shield components was not possible.

The frictional connection achieved by the positive-locking overlap along the connecting line by the respective shield components moreover ensures that additional fasteners can be omitted. The shielding component can be fixed directly by fixing means, such as screws or the like, on other machine and engine parts. Since additional fasteners, such as the angular bracket legs, can be omitted, additional parts are not necessary in the installation of the shielding component. This omission of additional parts accordingly helps to reduce production and installation costs. A stiff and high-strength shielding component structure is also achieved by the use of several shield components.

With the shielding component of the present invention, it is possible for the first time to provide a conventional, multi-layer heat shield with a gasket for sealing fluid passage through the shielding component in hot areas. For the purpose of a static gasket, the sealing function is maintained to the full extent, even if the shield components and their layers should move relative to one another due to heat.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 2:
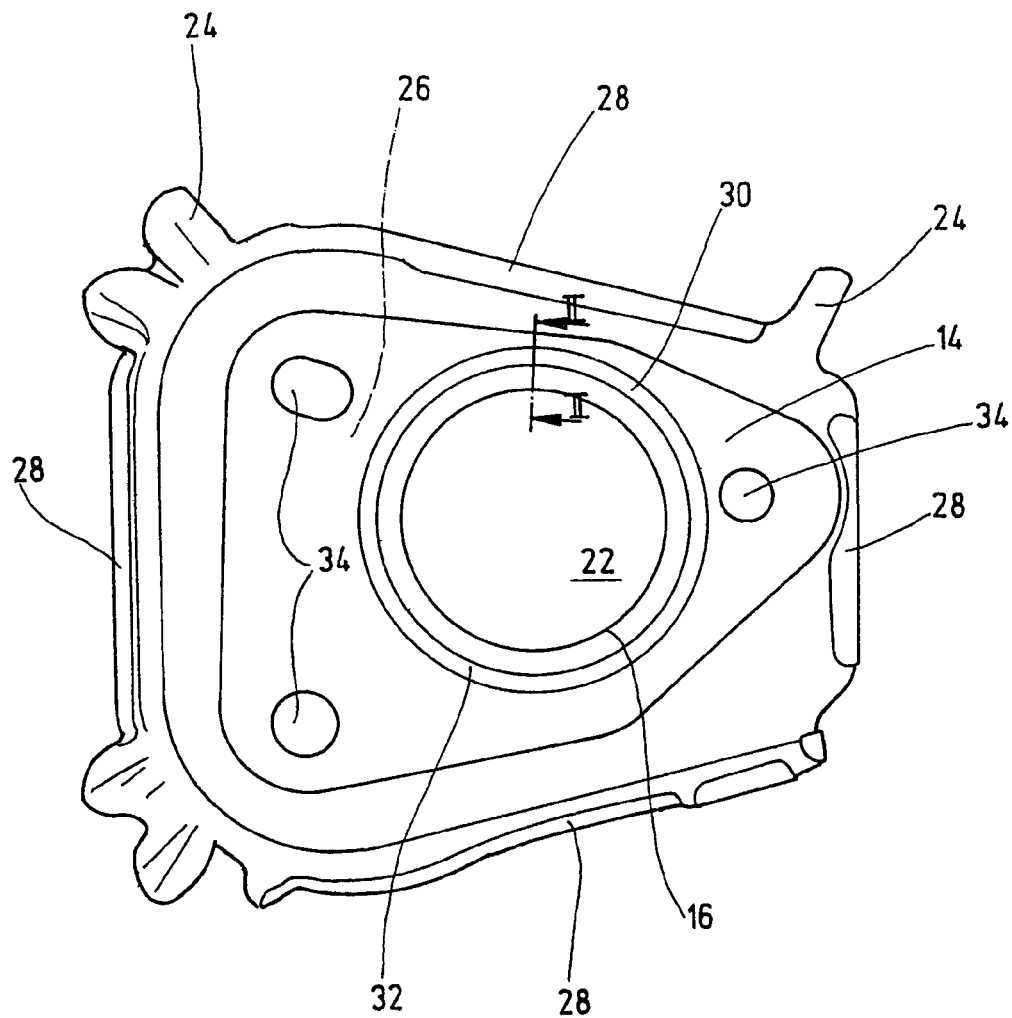
FIG. 2 is a bottom view of the heat shield of FIG. 1.
Figure 4:
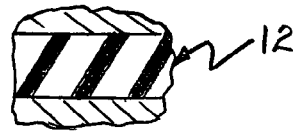
FIG. 4 is a partial side elevational view in section of the middle shield component of the heat shield of FIG. 1.

A shielding component according to the present invention is made, in particular, as a heat shield and has, at least in the middle area, individual shield components 10, 12, 14 lying partially flat on top of one another. These shield components 10, 12, 14 are connected to one another along a common connecting line 16. Along this common connecting line 16, the bottom shield component 14 shown in FIG. 2 encompasses the middle shield component 12 and the top shield component 10 on the edge side in an overlap 18 (compare FIG. 3). The overlap 18 is produced, in particular, by the bottom shield component 14 along an interior circumferential side end or edge being turned down with its free edge around a definable edge mounting 20. This edge mounting 20 determines essentially a defined compensation distance by which the shield components 10, 12, 14 are movably held by frictional engagement against one another to compensate for thermally occurring expansions, at least in the area of the connection.

As illustrated in the drawing figures, the connecting line 16 extends in an arc and encompasses a round passage opening 22. Opening 22 passes through all shield components 10, 12, 14, and is used for possible passage of the fluid flow, which can also be gaseous.

The middle shield component 12 is bordered in the middle area by the two shield components 10, 14, and is preferably made as a formed sheet metal part. The covering surfaces 24 of middle shield component 12 are bent at least partially on the edge side and contribute to ensuring thermal and/or acoustic insulation. The middle shield component 12 has of several layers, especially three layers, two sheet metal cover layers are able to accommodate between them an insulating intermediate layer which is not described in detail and in this way overlap it. The structure of such heat shields is conventional and is described for example in DE 10 2004 030 621 which was published subsequently, so that it will not be described in detailed here. So that the two sheet metal cover layers of the middle shield component 12 hold fast to one another, provision is made on the exterior circumferential side such that the top sheet metal cover layer at least partially covers the lower sheet metal cover layer by means of flanging 28. For the sake of easier representation, the flanging is only partially reproduced in FIG. 2. The two external shield components 10, 14 are formed essentially from the same flat sheet metal shapes and, especially in the installed state of the shielding component, lie flat along the respective contact surfaces 26 against the middle shield component 12. In all directions, middle shield component 12 has a greater extension than the exterior circumferential edge of the respective shield components 10, 14 forming the boundary for these shield components.

As the figures furthermore show, the overlap 18 takes place along the connecting line 16 forming the passage opening 22. In addition to the overlap 18 shown especially in FIG. 3, the shield components 10, 14 form an annular gasket 30 by an axial projection 32 produced by impressing an annular bead relative to their remaining flat extension (compare FIG. 3). Depending on the desired sealing function and configuration of the gasket, projections 32 can be radially offset relative to one another or provided only one shield component 10, 14 with a projection 32. For the sake of greater simplicity of illustration, in FIG. 3 the middle shield component 12 is shown as having only one layer. Fundamentally, the pertinent configuration of the shield components 10, 12, 14 with a total of only three sheet metal layers is possible. Likewise, a configuration in which only two shield components 10, 12 form the shielding component is possible.

Figure 1:
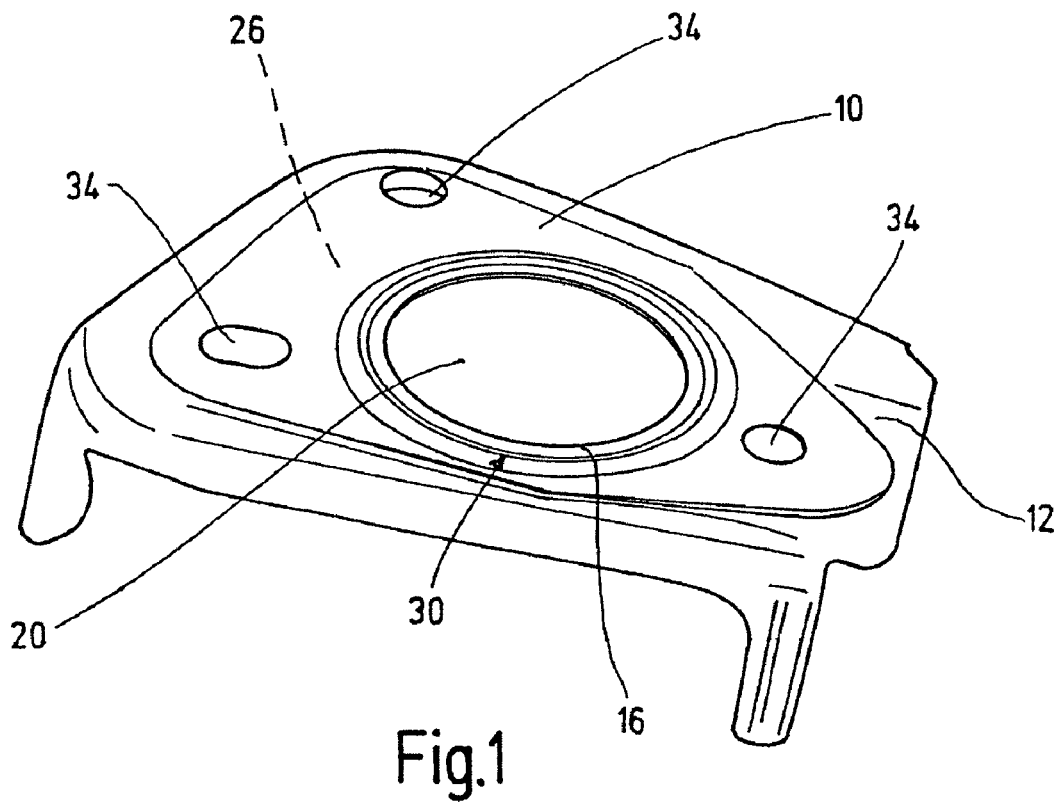
FIG. 1 is a perspective view of a heat shield according to an embodiment of the present invention.
Figure 3:
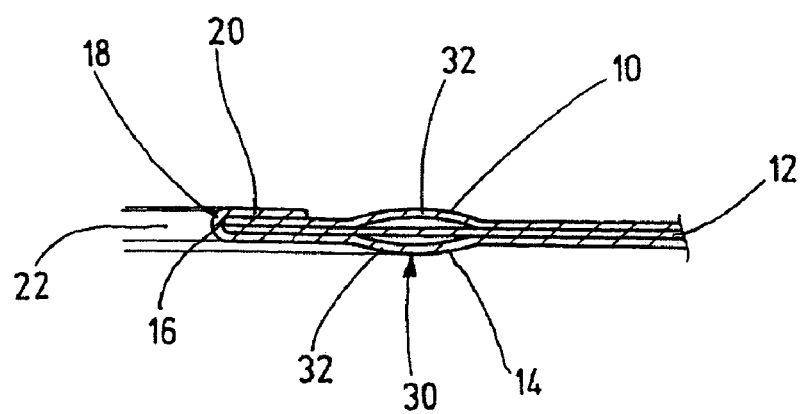
FIG. 3 is a partial side elevational view of the heat shield in section taken along line II-II of FIG. 2.

Based on the cited frictional connection of the individual shield components 10, 12, 14 to one another, even under thermal stress, the positions of the shield components relative to one another is maintained. The gasket 30 can perform its function in operation, even under high thermal stress. Since the respective projection 32 forming the gasket 30 is an integral component of the shield component 10 and of the shield component 14, in the installed state of the shielding component, the middle shield component 12 remains in its installation position. Relative to this stationary installation position, the two shield components 10, 14 connected to one another are displaced in the same respective directions. Since the overlap 18 in the area of the edge mounting 20, as shown in FIG. 3, has four layers, and regardless of the number of layers with respect to the flanging with the bottom shield component 14, the overlap always has one layer more than the layer combination in the area of the gasket 30. Overlap 18 achieves a stopper function for the gasket 30. It cannot be axially compressed when exposed to stress and relinquish the sealing function, since the possible compression process is limited by the thickness of the individual layers in the stopper region of the overlap 18, defined by the maximum thickness range. In this way the shielding component of the present invention could also be used as a cylinder head gasket with a heat shielding action. Preferably, the annular gasket 30 encloses the overlap 18 with its edge mounting 20 at the same radial distance. The gasket 30 could also be made differently, for example, such that several washers 30 in a concentric configuration encompass the fluid passage opening 22.

The individual shield components 10, 12, 14 congruently have further passage openings 34, each in the form of an elongated hole. Passage openings 34 are used to fix the shielding component on engine or machine components by conventional fixing means, such as screws.

With the present invention, it is ensured that individual attachment points do not unintentionally detach from the shielding component or that cracks cannot form on the shielding component as a result of thermal stresses. Based on the possible displacement motion of the individual layers, the sealing function is safeguarded by the gasket 30 in any working situation. In this way, reliable sealing of the passage opening 22 is achieved. The fluid flow which is to be controlled retains its fluid guidance and cannot emerge into the environment.

While one embodiment has been chosen to illustrate the invention, it will be understood by those skilled in the art that various changes and modifications can be made therein without departing from the scope of the invention as defined in the appended claims.

What is claimed is:

1. A heat shielding component for motor components, comprising:
   first, second and third shield components at least partially one on another, said second shield component being between said first and third shield components;
   a common connecting line along which said shield components are at least partially connected together;
   at least one of said shield components encompassing another of said shield components along said common connecting line in an overlap, said shield components being held within said overlap by frictional engagements allowing displacement relative to one another in a compensation distance; and
   a gasket formed by a projection on at least one of said shield components extending from a remaining flat extension thereof, said overlap having at least one more layer of said shield components than said annular gasket, said gasket surrounding said overlap at a constant radial distance, said projection being part of said first shield component and extends in a direction away from said second shield component.

2. A heat shielding component according to claim 1 wherein
   said connecting line extends along an arc, and encompasses a passage opening extending through said first, second and third shield components.

3. A heat shielding component according to claim 2 wherein
   additional passage openings extend congruently through said shield components.

4. A heat shielding component according to claim 1 wherein
   said second shield component is between said first and third shield components, and is provided with cover surfaces bent at least partially on a side edge thereof, and
   said first and third shield components have similar shapes, and hold said second shield component therebetween along common contact surfaces.

5. A heat shielding component according to claim 4 wherein
   said overlap extends along said common connecting line by said third shield component encompassing said second and first shield components.

6. A heat shielding component according to claim 4 wherein
   said second shield component has several layers; and
   said first and second shield components are each a single layer of sheet metal.

7. A heat shielding component according to claim 6 wherein
   said second shield component has an insulating intermediate layer.

8. A heat shielding component according to claim 1 wherein
   said projection is annular and is adjacent said overlap, and said overlap is annular.

9. A heat shielding component according to claim 1 wherein
   said third shield component includes another projection forming said gasket and extending in a direction away from said second shield component.

10. A heat shielding component according to claim 1 wherein
    aligned passage openings extend through said first, second and third shield components; and
    said overlap delimits said passage openings, and comprises a radially inner portion of said third shield component extending through said passage openings in said second and first shield components and overlying a surface of said first shield component remote from said second shield component.

11. A heat shielding component for motor components, comprising:
    first, second and third shield components at least partially one on another, said second shield component being between said first and third shield components;
    aligned passage openings extending through said first, second and third shield components;
    a common connecting line along which said shield components are at least partially connected together; and
    at least one of said shield components encompassing another of said shield components along said common connecting line in an overlap, said shield components being held within said overlap by frictional engagements allowing displacement relative to one another in a compensation distance, said overlap delimiting said passage openings and being a radially inner portion of said third shield component extending through said passage openings in said second and first shield components and overlying a surface of said first shield component remote from said second shield component.

12. A heat shielding component according to claim 11 wherein
    said connecting line extends along an arc, and encompasses a passage opening extending through said first, second and third shield components.

13. A heat shielding component according to claim 12 wherein
    additional passage openings extend congruently through said shield components.

14. A heat shielding component according to claim 11 wherein
    said second shield component is provided with cover surfaces bent at least partially on a side edge thereof; and
    said first and third shield components have similar shapes, and hold said second shield component therebetween along common contact surfaces.

15. A heat shielding component according to claim 14 wherein
    said second shield component has several layers; and
    said first and second shield components are each a single layer of sheet metal.

16. A heat shielding component according to claim 15 wherein
    said second shield component has an insulating intermediate layer.

17. A heat shielding component according to claim 11 wherein
    a gasket is formed by a projection on at least one of said shield components extending from a remaining flat extension thereof.

18. A heat shielding component according to claim 17 wherein
    said projection is annular and is adjacent said overlap; and said overlap is annular.
19. A heat shielding component according to claim 17 wherein
    said overlap comprises at least one more layer of said shield components than said annular gasket.
20. A heat shielding component according to claim 19 wherein
    said gasket surrounds said overlap at a constant radial distance.
21. A heat shielding component according to claim 20 wherein
    said projection is part of said first shield component and extends in a direction away from said second shield component.
22. A heat shielding component according to claim 21 wherein
    said third shield component includes another projection forming said gasket and extending in a direction away from said second shield component.

* * * * *